(12) United States Patent
Albrink et al.

(10) Patent No.: US 11,525,712 B2
(45) Date of Patent: Dec. 13, 2022

(54) METHOD AND TRANSFER DEVICE FOR TRANSFERRING DATA BLOCKS

(71) Applicant: Siemens Gamesa Renewable Energy A/S, Brande (DK)

(72) Inventors: Thomas Albrink, Havdrup Havdrup (DK); Henrik Dan Schierning Holme, Glostrup (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 398 days.

(21) Appl. No.: 15/931,891

(22) Filed: May 14, 2020

(65) Prior Publication Data
US 2020/0370931 A1 Nov. 26, 2020

(30) Foreign Application Priority Data

May 21, 2019 (EP) ..................... 19175690

(51) Int. Cl.
*G06F 13/42* (2006.01)
*G01D 13/26* (2006.01)
(Continued)

(52) U.S. Cl.
CPC ............. *G01D 13/26* (2013.01); *G01D 11/28* (2013.01); *G06F 5/10* (2013.01); *G06F 7/785* (2013.01); *G06F 13/28* (2013.01)

(58) Field of Classification Search
CPC ... G06F 5/065; G06F 5/10; G06F 7/76; G06F 7/78; G06F 7/785; G06F 11/3051;
(Continued)

(56) References Cited

U.S. PATENT DOCUMENTS

2004/0133713 A1* 7/2004 Elzur .................. H04L 69/12
710/52
2006/0173807 A1 8/2006 Weir et al.
(Continued)

FOREIGN PATENT DOCUMENTS

| CN | 102022264 A | 4/2011 |
| CN | 102193884 A | 9/2011 |
| WO | 2017174084 A1 | 10/2017 |

OTHER PUBLICATIONS

Chinese Office Action dated Sep. 1, 2021 for Application No. 202010435341.7.
(Continued)

*Primary Examiner* — Ilwoo Park
(74) *Attorney, Agent, or Firm* — Schmeiser, Olsen & Watts LLP (57) ABSTRACT

A method for transferring data blocks from a field device to a server, each data block including data describing an operation of the field device during a block time period is provided. The method includes setting a first and a second pointer delimiting a completed time period; and, until a predetermined transfer period elapses: transferring the data blocks having a block time period that is later than the second pointer to the server in a chronological order; and if all data blocks having a block time period that is later than the second pointer have been transferred to the server, transferring the data blocks having a block time period that is earlier than the first pointer to the server in an anti-chronological order. Data blocks can efficiently and reliably be transferred to the server.

12 Claims, 5 Drawing Sheets

(51) Int. Cl.
  *G01D 11/28*   (2006.01)
  *G06F 5/10*    (2006.01)
  *G06F 7/78*    (2006.01)
  *G06F 13/28*   (2006.01)

(58) Field of Classification Search
  CPC ............ G06F 11/3055; G06F 11/3058; G06F 11/3065; G06F 11/3089; G06F 11/34; G06F 11/3476; G06F 13/1626; G06F 13/1631; G06F 13/4009; G06F 13/4013
  USPC .......................................... 710/15–19, 33, 34
  See application file for complete search history.

(56) References Cited

U.S. PATENT DOCUMENTS

| | | |
|---|---|---|
| 2008/0098052 A1 | 4/2008 | Kim et al. |
| 2009/0043927 A1 | 2/2009 | Inoue et al. |
| 2010/0138267 A1 | 6/2010 | Vittal et al. |
| 2011/0225325 A1 | 9/2011 | Nomura et al. |
| 2014/0185390 A1* | 7/2014 | Mangano ............ G11C 7/1006 365/189.05 |
| 2018/0115529 A1* | 4/2018 | Munger ............ H04L 63/0227 |

OTHER PUBLICATIONS

Extended European Search Report dated Sep. 6, 2019 for Application No. 19175690.7.

* cited by examiner

METHOD AND TRANSFER DEVICE FOR TRANSFERRING DATA BLOCKS

CROSS-REFERENCE TO RELATED APPLICATIONS

This application claims priority to European Application No. 19175690.7, having a filing date of May 21, 2019, the entire contents of which are hereby incorporated by reference.

FIELD OF TECHNOLOGY

The following relates to a method for transferring data blocks from a field device to a server device. The following further relates to a transfer device for transferring data blocks from the field device to the server device.

BACKGROUND

Some field devices such as wind turbines collect historical data during their operation. It can be desired to transfer the collected data in data blocks from the field device to a server device, for example for analysis purposes. However, when the transfer of data from the field device to the server device is limited to a predetermined transfer period, transferring large amounts of data becomes difficult.

SUMMARY

An aspect relates to a transmission of data blocks from a field device to a server device.

According to a first aspect, a method for transferring data blocks from a field device to a server device, each data block comprising historical data describing an operation of the field device during a block time period, is provided. The method comprises:
  setting a first and a second pointer delimiting a completed time period such that all data blocks having a block time period comprised within the completed time period have previously successfully been transferred from the field device to the server device; and, until a predetermined transfer period elapses:
  transferring the data blocks having a block time period that is later than the second pointer to the server device in a chronological order starting from the data block having a block time period that is closest to the second pointer; and
  if all data blocks having a block time period that is later than the second pointer have been transferred to the server device, transferring the data blocks having a block time period that is earlier than the first pointer to the server device in an anti-chronological order starting from the data block having a block time period that is closest to the first pointer.

Newly collected data, which has not already been transmitted to the server device may thereby be transferred only during the predetermined transfer period. The transfer of data blocks to the server device is performed in an advantageous order. Namely, newer data (that is more recent than the second pointer) is transferred prior to transferring older data (that is older than the first pointer). Further, fragmentation of the database may further be reduced due to the structured way of transferring the data blocks.

The field device may be a device in an industrial environment performing predetermined tasks. In particular, the field device is a wind turbine generating electric power from wind power. During operation of the field device, some parameters of the field device may be measured and/or tracked, for example using sensors. These parameters may describe the operation of the field device and can be stored in the field device as historical data. For example, historical data describing the operation of a wind turbine may include a wind strength, a rotation speed of the wind turbine rotor blades or the like.

The server device, also called "central server", may be a server receiving historical data from one or several field devices. The server device may store the receive data and/or perform an analysis of the operation of the field device based on the received historical data.

For convenience, the historical data may be stored in data blocks. The data blocks can have a predetermined data structure. This facilitates the handling of the data blocks and the analysis thereof by the server device.

In particular, each data block has a block time period assigned thereto, indicating the time period during which the historical data forming the data block was collected during the operation of the field device. The block time period can be considered as a length measurement of the corresponding data block.

Due to the large amounts of historical data and in order to avoid data congestions, the data blocks may not all be transferred instantaneously to the server device. Further, a transmission of data blocks may only be allowed during the predetermined transfer period. The predetermined transfer period for example corresponds to a time during which the field device is not operating. Thereby, failures of the field device due to overload can be prevented and the data transfer to the server device can occur in a more reliable manner.

The transfer or transmission of the data blocks may be performed through a cable connecting the field device and the server device. Alternatively, the data transfer can be performed wirelessly.

When some of the data blocks have already been transferred to the server device, it is desirable to avoid transferring those same data blocks again and to transfer the remaining blocks in an advantageous order without omitting any data blocks. In view of this, first and second pointers are set. The two pointers can be seen as time pointers. The two pointers can indicate which data blocks have already been transferred to the server device and which ones have not. In particular, the setting of the pointers occurs based on a feedback information obtained by the field device from the server device which indicates a successful and complete transmission of the transmitted data blocks. These data blocks may then be placed within the completed time period which is de-limited by the two pointers. In particular, the two pointers are placed such that the data blocks having block time periods therebetween have reliably previously been transferred to the server device.

For example, the two pointers are placed right before starting the transfer of data blocks to the server device. The transfer of data blocks to the server device can be initiated by an operation stop of the field device, a start-up of the server device or the like.

The transfer or transmission of the data blocks may then be performed in the order described in more detail here below while the predetermined transfer period has not elapsed.

In detail, the data blocks that are more recent than the second time period may be transferred to the server device first. The data blocks can be transferred chronologically one after another, starting from the data block having a block time period that is closest to the second pointer. The data blocks can be transferred until either the predetermined transfer period elapses or until all data blocks that are more recent than the second pointer have been transferred. This may correspond to a situation where all data blocks having a block time period later than the first pointer have been transferred to the server device.

Afterwards, if the predetermined transfer period has not yet elapsed, the data blocks that are more ancient than the first time period may be transferred to the server device. The data blocks can be transferred anti-chronologically one after another, starting from the data block having a block time period that is closest to the first pointer. The data blocks can be transferred until either the predetermined transfer period elapses or until all data blocks that are older than the first pointer have been transferred. This may correspond to a situation where all data blocks have been transferred to the server device.

Recent data blocks are often more relevant for the server device because they can be used to analyze a recent operation of the field device and potentially to detect any flaws in the operation of the field device and/or to predict failures of the field device. Transferring the more recent data blocks earlier than the older data blocks is advantageous because more relevant data is transferred first.

Further, using the two pointers can be useful in order to avoid transferring the same data blocks multiple times and/or in order to prevent omission of transfer of some data blocks.

A network traffic and a load on the server device can be kept small because only necessary queries are routed to the server device.

Moreover, fragmentation of the database may advantageously be reduced due to the structured way of transferring the data blocks. This facilitates the handling of the data by the server device.

According to an embodiment, the method further comprises:
  updating a position of the second pointer upon completed transfer of the data block having a block time that is closest to the second pointer; and/or
  updating a position of the first pointer upon completed transfer of the data block having a block time that is closest to the first pointer.

In particular, the position of the pointers may be updated dynamically as the data blocks are transferred. This can be advantageous because when the transfer stops (expectedly or unexpectedly), the transfer can later be resumed and continued from the stopping point.

For example, the position of the pointers may only be updated upon reception of a feedback information from the server device indicating that the last transmitted data block has been successfully received at the server device. This increases the reliability of the transfer as the pointers are more reliably set, thereby avoiding the omission of any data block to be transferred.

According to a further embodiment, the method further comprises:
  skipping the transfer of the one or several data blocks which have already been transferred to the server device when transferring the data blocks having a block time period that is later than the second pointer and/or earlier than the first pointer.

When transferring the data blocks that are more recent than the second pointer or more ancient than the first pointer, the field device may come across some data blocks which have already been transferred to the server device. For example, the server device may already have received a positive feedback information from the server device indicating the successful transmission of this data block. In this case, the transfer of the already transferred data block may not be repeated. Instead, it can be skipped. In particular, when coming across such an already transmitted data block, the position of the first or second pointer is updated such as to include the block time period of the already transmitted data block.

Since the already transmitted data block is not transmitted again, the data transmission to the server device can become more efficient.

According to a further embodiment, the field device is a wind turbine.

In some embodiments, the server device is a turbine interface computer.

According to a further embodiment, the method further comprises:
  stopping the transfer of data blocks to the server device after completing any uncompleted data block transfer as soon as the predetermined transfer period elapses.

Completing any uncompleted data block transfer upon completion of the predetermined transfer period can be useful in order to avoid uncompleted transmissions of data blocks. This can improve the reliability of the data transfer.

According to a further embodiment, each block period has the same length in time.

According to a further embodiment, each block period lasts between 1 and 20 minutes, in particular between 5 and 15 minutes. In particular, each block period last 10 minutes.

According to a further embodiment, the data blocks all have identical data structures. This can facilitate the handling of the data blocks, in particular by the server device.

According to a further embodiment, the method further comprises:
  storing the data blocks in the field device after collection of the historical data and before transferring the data blocks to the server device.

The historical data may remain stored in the field device after it is transferred to the server device. In particular, the historical data is not dynamic data that is transferred to the server device right after being generated.

According to a second aspect, embodiments of the invention relates to a computer program product (non-transitory computer readable storage medium having instructions, which when executed by a processor, perform actions) comprising a program code for executing the method according to the first aspect or according to an embodiment thereof when run on at least one computer. The program code may initiate the steps of the method according to the first aspect or according to an embodiment thereof.

A computer program product, such as a computer program means, may be embodied as a memory card, USB stick, CD-ROM, DVD or as a file which may be downloaded from a server device in a network. For example, such a file may be provided by transferring the file comprising the computer program product from a wireless communication network.

According to a third aspect, a transfer device for transferring data blocks from a field device to a server device, each data block comprising historical data describing an operation of the field device during a block time period, is provided. The transfer device comprises:
  a setting unit for setting a first and a second pointer delimiting a completed time period such that all data blocks having a block time period comprised within the completed time period have previously successfully been transferred from the field device to the server device; and a transfer unit for, until a predetermined transfer period elapses:

transferring the data blocks having a block time period that is later than the second pointer to the server device in a chronological order starting from the data block having a block time period that is closest to the second pointer; and if all data blocks having a block time period that is later than the second pointer have been transferred to the server device, transferring the data blocks having a block time period that is earlier than the first pointer to the server device in an anti-chronological order starting from the data block having a block time period that is closest to the first pointer.

The respective units, e.g. the setting unit and the transfer unit, may be implemented in hardware and/or in software. If the unit is implemented in hardware, it may be embodied as a field device, e.g. as a computer or as a processor or as a part of a system, e.g. a computer system. If the unit is implemented in software it may be embodied as a computer program product, as a function, as a routine, as a program code or as an executable object.

The embodiments and features described with reference to the method according to the first aspect or according to an embodiment thereof apply mutatis mutandis to the transfer device of the third aspect.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with references to the following Figures, wherein like designations denote like members, wherein.

DETAILED DESCRIPTION

Figure 1:
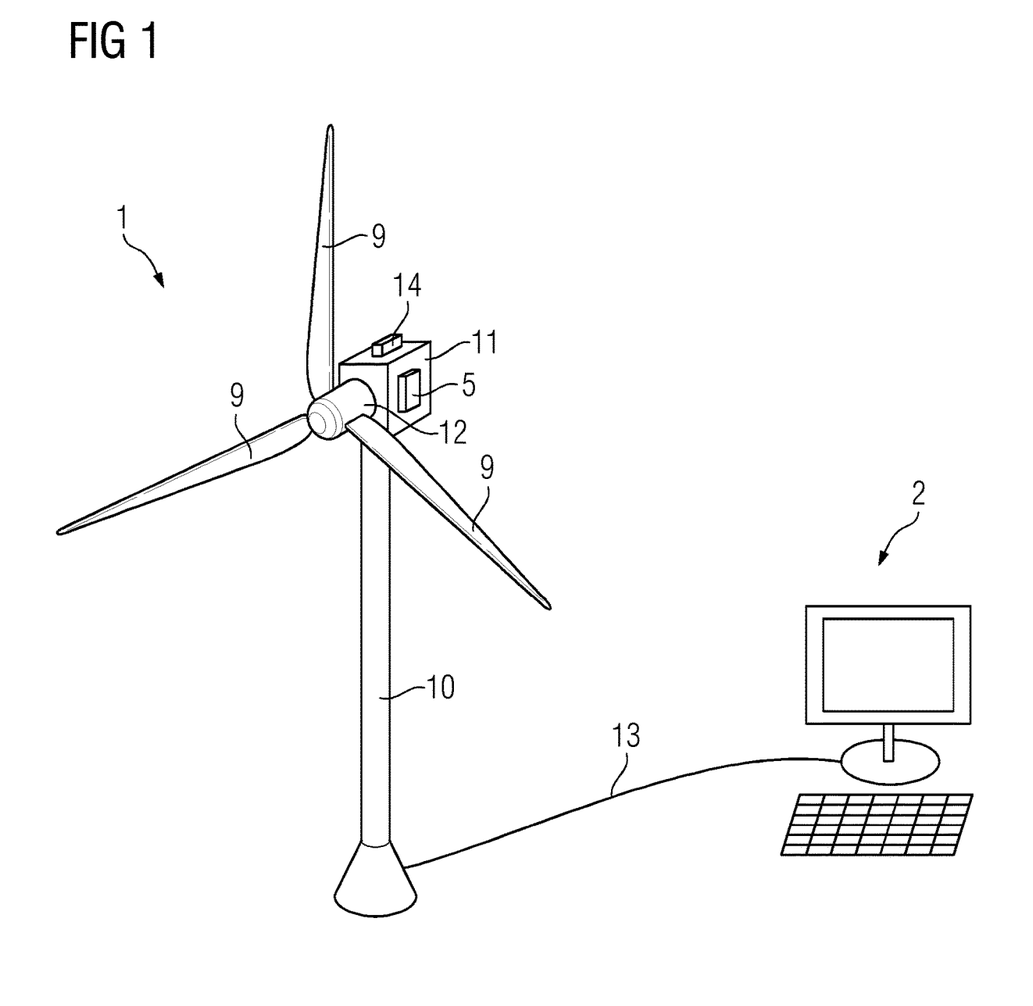
FIG. 1 shows an example of a system including a field device, a server device and a transfer device.

FIG. 1 shows an example of a system including a field device 1, a server device 2 and a transfer device 5.

The field device 1 is a wind turbine in the present example. The wind turbine 1 comprises a rotor 12 connected to a generator (not shown) arranged inside a nacelle 11. The nacelle 11 is arranged at the upper end of a tower 10 of the wind turbine 1. The wind turbine 1 comprises three rotor blades 9 attached to the rotor 12 which rotate when they are exposed to wind. Upon rotation of the rotor blades 9, the generator of the wind turbine 1 generates electricity.

The wind turbine 1 shown in FIG. 1 is connected to a server device 2 through a cable 13. The server device 2 shown in FIG. 1 is a personal computer serving as a central server. The server 2 can be connected to further field devices, in particular wind turbines (not shown in FIG. 1).

The nacelle 11 comprises the transfer device 5 and a plurality of sensors 14. Without loss of generality, FIG. 1 shows only one sensor 14. During operation of the wind turbine 1, that is when the wind turbine 1 generates electrical power from wind power, the sensors 14 sense operation properties of the wind turbine 1 including a wind speed, a rotation speed of the rotor blades 9 and an amount of produced electrical power. The sensed information is stored in an internal storage unit (not shown) of the wind turbine 1 as historical data 3.

Figure 3:
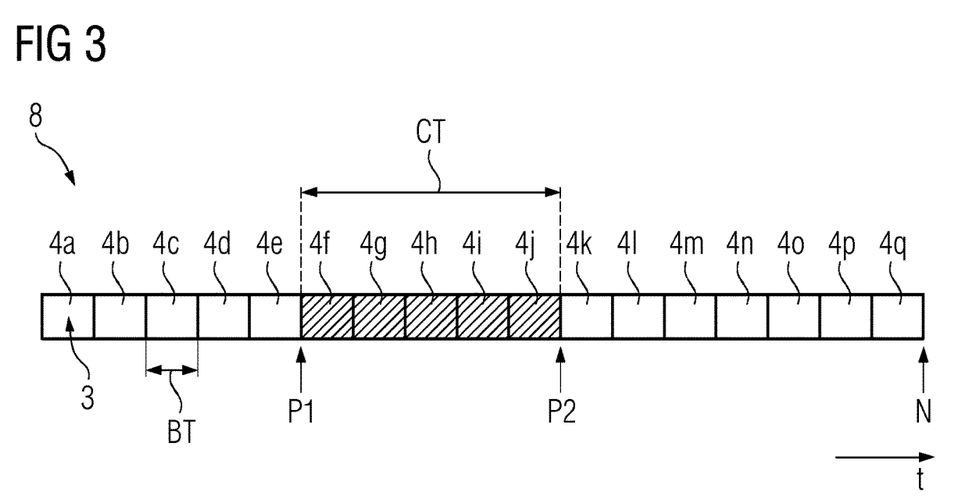
FIG. 3 shows an example of a database.

FIG. 3 shows a database 8 comprising historical data 3 collected during operation of the wind turbine 1 and stored in the wind turbine 1. In the database 8, the historical data 3 is stored in a plurality of data blocks 4a-4q. The data blocks 4a-4q all comprise historical data 3 ordered in a same predetermined structure.

Each data block 4a-4q includes historical data 3 that was collected during a block time period BT. Although the block time period BT is only shown for the data block 4c in FIG. 3, it is the same for all other data blocks 4a-4q as well. In the present example, each block time period BT is ten minutes long.

In the example of FIG. 3, some of the data blocks 4a-4q have already been transferred to the server 2. These data blocks 4f-4j are hatched in FIG. 3. All non-hatched data blocks 4a-4e and 4k-4q have not yet been transferred to the server 2. In FIG. 3, the current time (now) is indicated by "N". The time evolves along the direction indicated by the arrow labelled "t".

Figure 2:
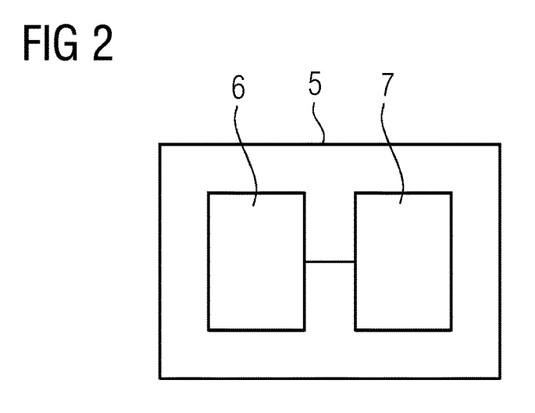
FIG. 2 shows an example of a transfer device.

The transfer device 5 shown in FIG. 1 is used to transfer the data blocks 4a-4q to the server 2 through the cable 13. In detail, the transfer device 5 comprises a setting unit 6 as well as a transfer unit 7, as shown in FIG. 2. The transfer device 5 is capable of executing a method for transferring data blocks 4a-4q from the wind turbine 1 to the server 2. A first embodiment of such a method is shown in FIG. 4.

Figures 4, 5:
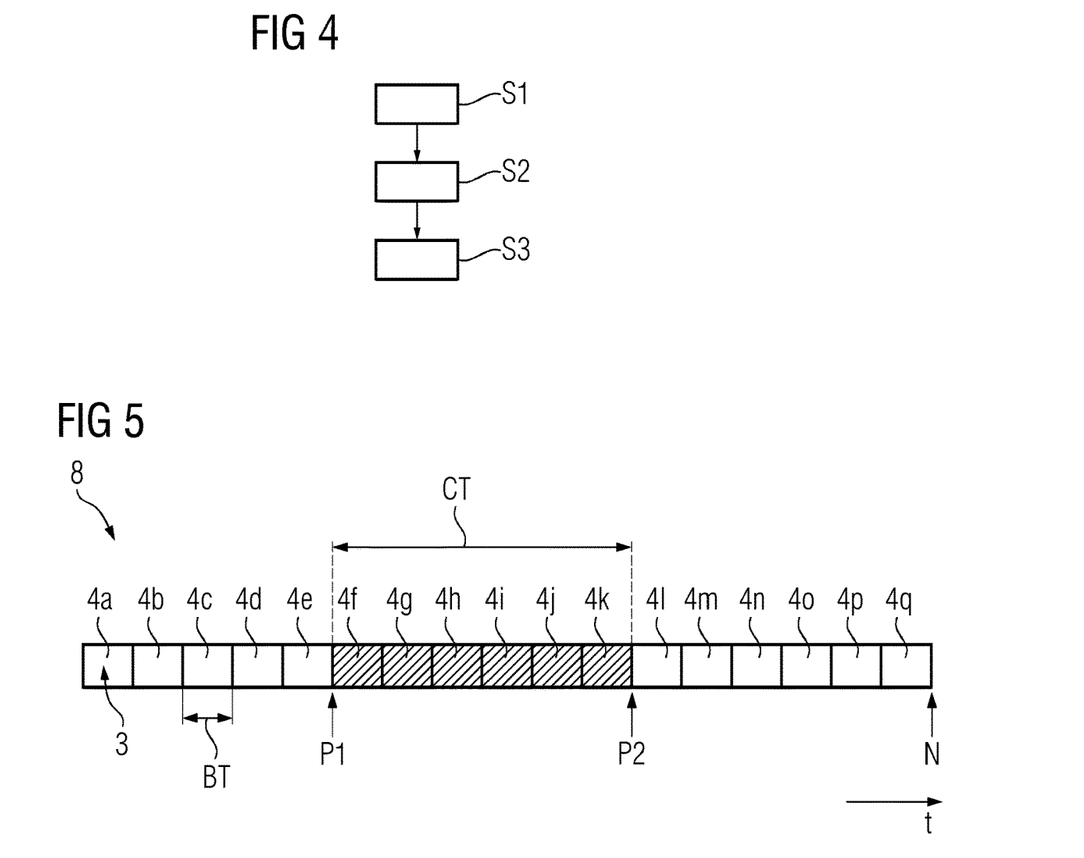
FIG. 4 shows a method for transferring data blocks according to a first embodiment.
FIG. 5 shows another example of a database.

In a step S1 of FIG. 4, a first pointer P1 and a second pointer P2 delimiting a completed time period CT are set. This step S1 is performed by the setting unit 6 of the transfer device 5.

In detail, the setting unit 6 sets the pointers P1 and P2 such that the block time periods BT of all the already transferred data blocks 4a-4q are included in the completed time period. In the example of FIG. 3, the pointers P1 and P2 are set to as to include the block time periods BT of the data blocks 4f-4j. The first pointer P1 is placed between data blocks 4e and 4f and the second pointer P2 is placed between data blocks 4j and 4k, as illustrated in FIG. 3.

Then, in a step S2 of FIG. 4, data blocks 4a-4q having a block time period BT that is later than the second pointer P2 are chronologically transferred to the server 2 through the cable 13. Step S2 is executed by the transfer unit 7 of the transfer device 5. In the present example, the data blocks 4k-4q are more recent than the second pointer P2 and are transferred in step S2, starting with data block 4k which is closest from the second pointer P2.

As shown in FIG. 5, the data block 4k is transferred first. Then, the position of the second pointer P2 is updated. Afterwards, the data blocks 4l, 4m, 4n, 4o, 4p and 4q are transferred to the server 2 in this order. The data blocks 4k-4q are however only transferred to the server 2 as long as a predetermined transfer period has not elapsed. This predetermined transfer period defines a time period during which data blocks 4a-4q can be transferred to the server 2.

Figure 6:
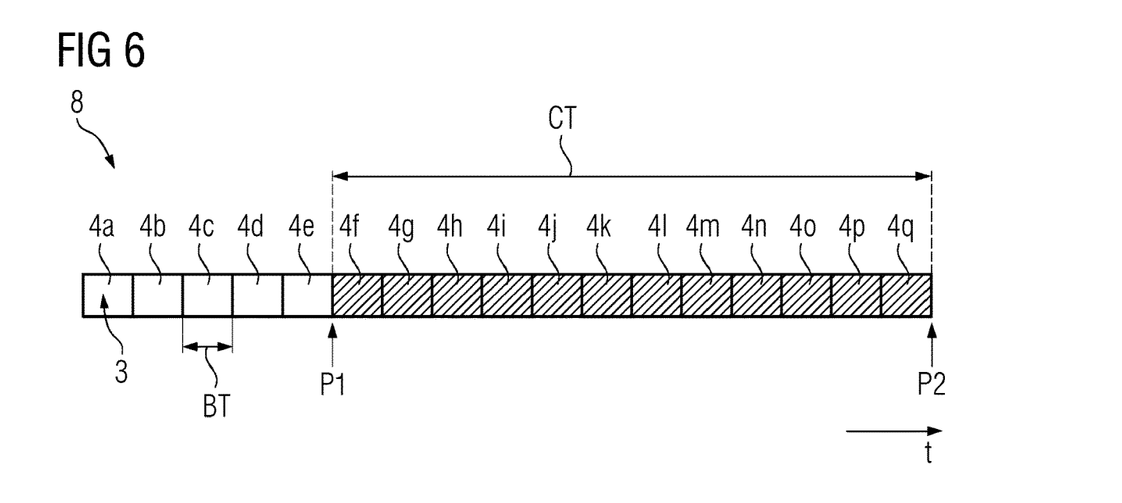
FIG. 6 shows another example of a database.

When all data blocks 4k-4q which contain historical data 3 that is more recent than the second pointer P2 have been transmitted to the server 2 (see FIG. 6), step S3 of the method of FIG. 4 is executed.

In detail, in step S3 of FIG. 4, data blocks 4a-4q having a block time period BT that is earlier than the first pointer P1 are anti-chronologically transferred to the server 2 through the cable 13. Step S3 is also executed by the transfer unit 7 of the transfer device 5. In the present example, the data blocks 4a-4e are more ancient than the first pointer P1 and are transferred to the server in step S3, starting with data block 4e which is closest from the first pointer P1.

Figure 7:
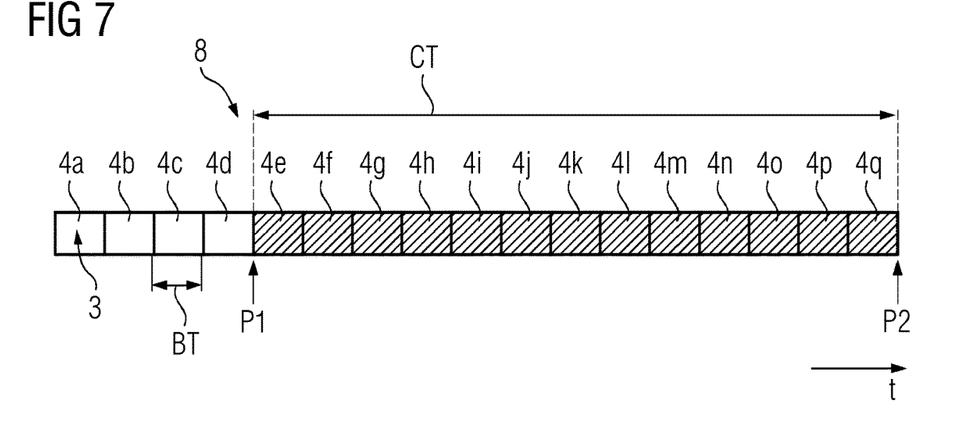
FIG. 7 shows another example of a database.

As shown in FIG. 7, the data block 4e is transferred first during step S3. Then, the position of the first pointer P1 is updated. Afterwards, the data blocks 4d, 4c, 4b and 4a are transferred to the server 2 in this order. The data blocks 4a-4e are however only transferred to the server 2 as long as the predetermined transfer period has not elapsed.

Overall, the position of the pointers P1 and P2 indicates which data blocks 4a-4q were transferred to the server 2 at any time.

Figure 8:
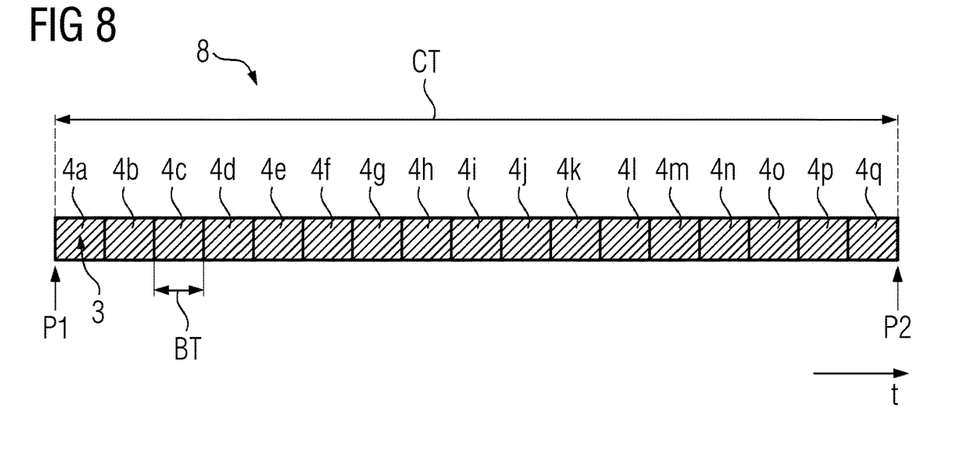
FIG. 8 shows another example of a database.

If the predetermined transfer period is long enough, all data blocks 4a-4q get transmitted to the server 2, as shown in FIG. 8.

If the predetermined transfer period elapses during step S2 or S3, the transfer of data blocks 4a-4q is stopped after completing the current transfer and the position of the pointer P1, P2 is updated accordingly. The dynamical update of the position of the pointers P1 and P2 allows to resume the transfer of the data blocks 4a-4q from where is was stopped, without omitting any data blocks 4a-4q and without repeating any transfer of data blocks 4a-4q.

Overall, the data blocks 4a-4q all get transferred to the server 2 reliably and in a rather grouped (chronological or anti-chronological) manner. This facilitates an analysis of the historical data 3 contained in the data blocks 4a-4q by the server 2. Further, transferring the newer data blocks 4a-4q before transferring older data blocks 4a-4q is advantageous in view of the analysis performed by the server 2.

Figure 9:
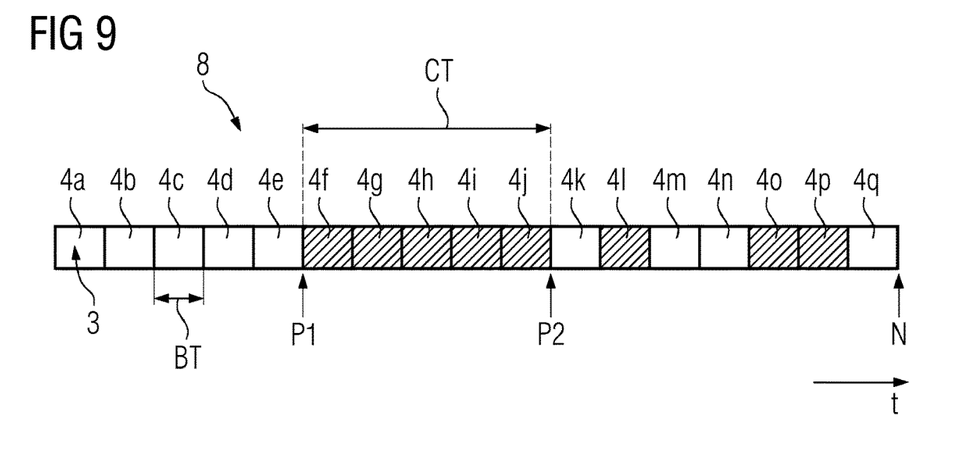
FIG. 9 shows another example of a database.

FIG. 9 shows a further example of a database 8 with data blocks 4a-4q to be transferred to the server 2. Here, some scattered data blocks 4l, 4o and 4p (hatched in FIG. 9) were already transferred to the server 2 but are not included in the completed time period CT defined by the pointers P1 and P2. This is because the block time periods BT of all data blocks 4a-4q located between the pointers P1 and P2 have necessarily already been transferred to the server 2. Since the data blocks 4k, 4m and 4n of FIG. 9 were not yet transferred to the server 2, they cannot be included in the completed time period CT. The completed time period CT is the time period including the most block time periods BT of transferred data blocks 4a-4q.

The database 8 of FIG. 9 can be transferred along the same lines as described above, using the method of FIG. 4. The only difference is that the data blocks 4l, 4o and 4p, which have already been transferred, are not transferred again. Rather, their transfer is skipped and the position of the pointer P2 is updated accordingly.

Figure 10:
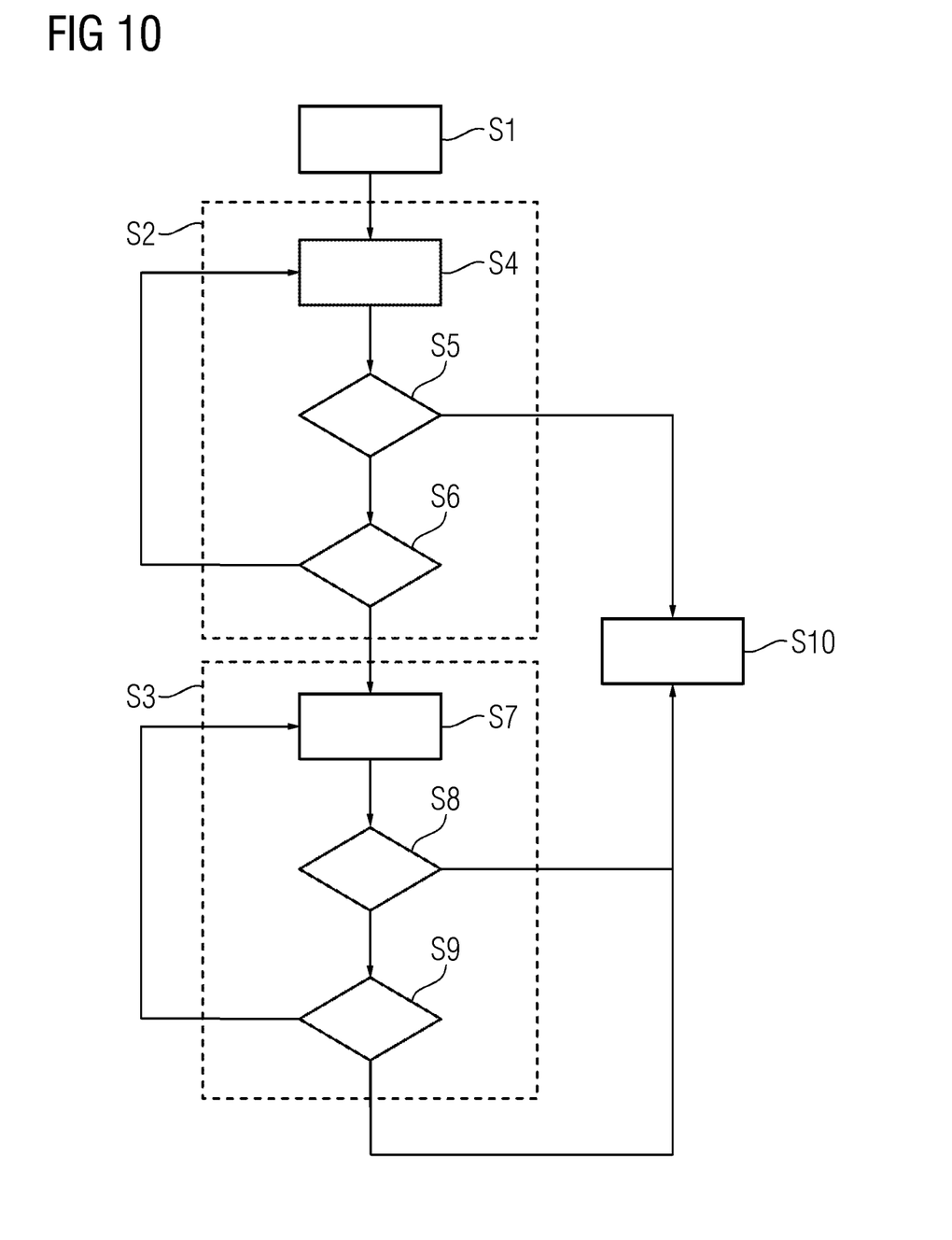
FIG. 10 shows a method for transferring data blocks according to a second embodiment.

FIG. 10 shows a method for transferring data blocks according to a second embodiment. This method can also be executed using the transfer device 5 of FIGS. 1 and 2.

The method of FIG. 10 includes the steps S1-S3 which were already described in view of FIG. 4 above. However, step S2 of FIG. 10 includes steps S4, S5 and S6, and step S3 of FIG. 10 includes steps S7, S8 and S9. In step S4, the data block 4a-4q which is closest to the second pointer P2 and more recent than the second pointer P2 is transferred. Then, in step S5, the transfer device 5 checks whether the predetermined transfer period has elapsed. If so, the transfer process is stopped in step S10. Otherwise, if the predetermined transfer period has not elapsed, it is checked whether all data blocks 4a-4q that are more recent than the second pointer P2 have been transferred to the server 2 in step S6. If not, the steps S4 to S6 are repeated.

If it is determined in step S6 that all data blocks 4a-4q that are more recent than the second pointer P2 have been transferred to the server 2, the process continues with step S7. In step S7, the data block 4a-4q which is closest to the first pointer P1 and more ancient than the first pointer P1 is transferred. Then, in step S8, the transfer device 5 checks whether the predetermined transfer period has elapsed. If so, the transfer process is stopped in step S10. Otherwise, if the predetermined transfer period has not elapsed, it is checked whether all data blocks 4a-4q that are more ancient than the first pointer P1 have been transferred to the server 2 in step S9. If not, the steps S7 to S9 are repeated. If it is determined in step S8 that all data blocks 4a-4q that are more ancient than the first pointer P1 have been transferred to the server 2, the transfer process is terminated (step S10).

Although embodiments of the present invention has been described in accordance with preferred embodiments, it is obvious for the person skilled in the art that modifications are possible in all embodiments. For example, the database 8 can be modified in order to comprise more or less data blocks 4a-4q. Any combination of data blocks 4a-4q can initially be comprised in the completed time period CT. Instead of being transferred through a cable 13, the data blocks 4a-4q can also be transferred wirelessly from the field device 1 to the server device 2. Instead of being part of the field device 1, the transfer device 5 may be a separate entity. The historical data 3 can include other operation properties of the field device 1.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for transferring data blocks from a field device to a server device, each data block comprising historical data describing an operation of the field device during a block time period, the method comprising:

setting a first pointer and a second pointer delimiting a completed time period such that all data blocks having a block time period comprised within the completed time period have previously successfully been transferred from the field device to the server device; and until a predetermined transfer period elapses:

transferring the data blocks having a block time period that is later than the second pointer to the server device in a chronological order starting from the data block having a block time period that is closest to the second pointer; and if all data blocks having a block time period that is later than the second pointer have been transferred to the server device, transferring the data blocks having a block time period that is earlier than the first pointer to the server device in an anti-chronological order starting from the data block having a block time period that is closest to the first pointer.

2. The method according to claim 1, further comprising:
updating a position of the second pointer upon completed transfer of the data block having a block time that is closest to the second pointer; and/or
updating a position of the first pointer upon completed transfer of the data block having a block time that is closest to the first pointer.

3. The method according to claim 1, further comprising:
skipping the transfer of the one or several data blocks which have already been transferred to the server device when transferring the data blocks having a block time period that is later than the second pointer and/or earlier than the first pointer.

4. The method according to claim 1, wherein the field device is a wind turbine.

5. The method according to claim 1, further comprising:
stopping the transfer of data blocks to the server device after completing any uncompleted data block transfer as soon as the predetermined transfer period elapses.

6. The method according to claim 1, wherein each block time period has a same length in time.

7. The method according to claim 6, wherein each block time period lasts between 1 and 20 minutes.

8. The method according to claim 1, wherein the data blocks all have identical data structures.

9. The method according to claim 1, further comprising:
storing the data blocks in the field device after collection of the historical data and before transferring the data blocks to the server device.

10. A computer program product, comprising a computer readable hardware storage device having computer readable program code stored therein, said program code executable by a processor of a computer system to implement the method according to claim 1 when run on at least one computer.

11. A transfer device for transferring data blocks from a field device to a server device, each data block comprising historical data describing an operation of the field device during a block time period, the transfer device comprising:
a setting unit for setting a first pointer and a second pointer delimiting a completed time period such that all data blocks having a block time period comprised within the completed time period have previously successfully been transferred from the field device to the server device; and
a transfer unit for, until a predetermined transfer period elapses:
transferring the data blocks having a block time period that is later than the second pointer to the server device in a chronological order starting from the data block having a block time period that is closest to the second pointer; and
if all data blocks having a block time period that is later than the second pointer have been transferred to the server device, transferring the data blocks having a block time period that is earlier than the first pointer to the server device in an anti-chronological order starting from the data block having a block time period that is closest to the first pointer.

12. The transfer device according to claim 11, for executing a method for transferring data blocks from the field device to the server device.

* * * * *